United States Patent
Mukai et al.

(10) Patent No.: US 9,309,426 B2
(45) Date of Patent: Apr. 12, 2016

(54) INK COMPOSITION AND INK JET RECORDING METHOD

(71) Applicant: Seiko Epson Corporation, Tokyo (JP)

(72) Inventors: Hiroshi Mukai, Shiojiri (JP); Toshihiro Shinbara, Matsumoto (JP)

(73) Assignee: Seiko Epson Corporation (JP)

( * ) Notice: Subject to any disclaimer, the term of this patent is extended or adjusted under 35 U.S.C. 154(b) by 122 days.

(21) Appl. No.: 14/184,017

(22) Filed: Feb. 19, 2014

(65) Prior Publication Data

US 2014/0232782 A1 Aug. 21, 2014

(30) Foreign Application Priority Data

Feb. 21, 2013 (JP) ................. 2013-032418

(51) Int. Cl.
*B41J 2/01* (2006.01)
*C09D 11/322* (2014.01)
*B41J 2/21* (2006.01)
*C09D 11/12* (2006.01)

(52) U.S. Cl.
CPC ............. *C09D 11/322* (2013.01); *B41J 2/2107* (2013.01); *C09D 11/12* (2013.01); *B41J 2/01* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218

USPC ............ 347/95–105, 88, 20, 21, 9; 106/31.6, 106/31.13, 31.27; 523/161, 162
See application file for complete search history.

(56) References Cited

U.S. PATENT DOCUMENTS

| | | | |
|---|---|---|---|
| 7,915,326 B2 * | 3/2011 | Oguchi et al. | 523/160 |
| 8,210,672 B2 | 7/2012 | Mukai et al. | |
| 2006/0035999 A1 * | 2/2006 | Bedford et al. | 523/160 |
| 2009/0246479 A1 | 10/2009 | Mukai et al. | |
| 2012/0026239 A1 * | 2/2012 | Yanagi | 347/21 |
| 2012/0040156 A1 * | 2/2012 | Ohashi et al. | 106/31.13 |
| 2012/0232203 A1 * | 9/2012 | Tomura et al. | 524/388 |
| 2012/0249705 A1 | 10/2012 | Aoki et al. | |
| 2012/0252942 A1 | 10/2012 | Aoki et al. | |

FOREIGN PATENT DOCUMENTS

| | | |
|---|---|---|
| JP | 2002-080761 A | 3/2002 |
| JP | 2009-242441 A | 10/2009 |
| JP | 2010-006062 A | 1/2010 |
| JP | 2012-025911 A | 2/2012 |
| JP | 2012-206488 A | 10/2012 |
| JP | 2012-214650 A | 11/2012 |
| JP | 2012-224044 A | 11/2012 |

* cited by examiner

*Primary Examiner* — Manish S Shah
(74) *Attorney, Agent, or Firm* — Harness, Dickey & Pierce, P.L.C.

(57) ABSTRACT

An ink composition contains a pigment, first wax particles, second wax particles, and a resin emulsion, in which the first wax particles have a melting point of 120° C. or higher and 170° C. or lower, the second wax particles have a melting point of 70° C. or higher and less than 120° C., the resin emulsion has a glass transition point of 50° C. or higher and 150° C. or lower, the first wax particles contain one or more kinds of wax particles selected from the group consisting of polyethylene wax particles or polypropylene wax particles, and the second wax particles contain one or more kinds of wax particles selected from the group consisting of polyethylene wax particles.

13 Claims, No Drawings

INK COMPOSITION AND INK JET RECORDING METHOD

BACKGROUND

1. Technical Field

The present invention relates to an ink composition and an ink jet recording method.

2. Related Art

Heretofore, recording employing an ink jet recording method includes supplying ink to a discharge head, and then discharging small ink droplets from the discharge head to cause the small ink droplets to fly to thereby make the small ink droplets adhere onto recording media, such as paper.

JP-A-2002-80761 discloses a recording liquid for ink printer at least containing a colorant, two or more kinds of resin particles, wax, and water aiming at providing a recording liquid for ink printer which can obtain high-definition images free from blurring and penetration of the recording liquid on a recording paper, having a very high image density, and having water resistance and which can be continuously and stably discharged without causing clogging.

However, when such a former ink composition for ink-absorbing recording media is used for recording on non-ink-absorbing or low-ink-absorbing recording media, there is a problem in that the abrasion resistance of recorded matter deteriorates. On the other hand, when an ink composition containing wax having a high melting point is used for the purpose of increasing the abrasion resistance and the like is used, there is a problem in that an aggregated wax component is solidified in some cases, so that nozzles of an ink jet discharge head are clogged to impair discharge stability.

When sufficient drying by heating is not performed in plastic film recording, there is also a problem in that a solvent remains in an ink film to cause a reduction in strength of the ink film, so that the abrasion resistance deteriorates. In order to sufficiently perform the drying by heating, the drying temperature may be increased to be high or the drying time may be lengthened. However, from the viewpoint of increasing the productivity, when the drying time of an ink composition supplied to a recording medium is shortened and the drying temperature is increased to be high, there is a problem in that the ink film forming the recorded matter becomes weak, so that the abrasion resistance deteriorates.

SUMMARY

The invention has been made in order to at least partially solve the above-described problems. An advantage of some aspects of the invention is to provide an ink composition which provides recorded matter excellent in abrasion resistance, whose abrasion resistance does not deteriorate even in high temperature drying, and which is excellent also in recording stability when used for a non-ink-absorbing or low-ink-absorbing recording medium and an ink jet recording method using the ink composition.

The present inventors have conducted extensive research in order to solve the above-described problems. As a result, the present inventors have found that a film with high abrasion resistance can be obtained by the use of first wax particles with a relatively high melting point and a resin emulsion with a high Tg. However, the first wax particles aggregate to adhere to nozzles of an ink jet discharge head, which has posed a new problem in that the discharge stability is impaired.

To solve the problem, the present inventors have further conducted extensive research, and have found that, by setting the Tg of the resin emulsion in a predetermined range and using second wax particles with a relatively low melting point in combination with the first wax particles, the above-described problem can be solved, and then accomplished the invention.

More specifically, the invention is as follows.

[1] According to a first aspect of the invention, an ink composition contains a pigment, first wax particles, second wax particles, and a resin emulsion. The first wax particles have a melting point of 120° C. or higher and 170° C. or lower. The second wax particles have a melting point of 70° C. or higher and less than 120° C. The resin emulsion has a glass transition point of 50° C. or higher and 150° C. or lower. The first wax particles contain one or more kinds of wax particles selected from the group consisting of polyethylene wax particles or polypropylene wax particles. The second wax particles contain polyethylene wax particles.

[2] The ink composition is preferable substantially not to contain alkylpolyol having a normal boiling point of 280° C. or higher.

[3] The amount of the second wax particles may be larger in terms of mass than the amount of the first wax particles.

[4] The mass ratio of the total amount of the first wax particles and the second wax particles to the total amount of the resin emulsion may be 1:5 to 5:2.

[5] The ink composition may further contains an aprotic polar solvent.

[6] The ink composition may further contains a water-soluble resin.

[7] According to a second aspect of the invention, an ink jet recording method includes a discharge process of discharging the ink composition according to any one of [1] to [6] above to a recording medium and causing the ink composition to adhere thereto using a discharge head, and a heating process of heating the recording medium to which the ink composition adheres.

[8] The heating temperature in the heating process may be higher than 80° C. and 120° C. or lower.

DESCRIPTION OF EXEMPLARY EMBODIMENTS

Hereinafter, an aspect (hereinafter referred to as "this embodiment") for carrying out the invention is described in detail but the invention is not limited thereto and can be modified in various manners without deviating from the gist.

Ink Composition

An ink composition of this embodiment contains a pigment, first wax particles, second wax particles, and a resin emulsion, in which the first wax particles have a melting point of 120° C. or higher and 170° C. or lower, the second wax particles have a melting point of 70° C. or higher and less than 120° C., the resin emulsion has a glass transition point (hereinafter also referred to as "Tg") of 50° C. or higher and 150° C. or lower, the first wax particles contain one or more kinds of wax particles selected from the group consisting of polyethylene wax particles or polypropylene wax particles, and the second wax particles contain polyethylene wax particles.

Pigment

The ink composition contains a pigment. The pigment is not particularly limited and known substances mentioned below can be used. Inorganic pigments are not particularly limited and carbon blacks (C.I. Pigment Black 7), such as furnace black, lamp black, acetylene black, and channel black, iron oxide, and titanium oxide can be used, for example.

Organic pigments are not particularly limited and include, for example, azo pigments, such as an insoluble azo pigment, a condensed azo pigment, an azo lake, and a chelate azo pigment, polycyclic pigments, such as a phthalocyanine pigment, a perylene and perinone pigment, an anthraquinone pigment, a quinacridone pigment, a dioxane pigment, a thioindigo pigment, an isoindolinone pigment, and a quinophthalone pigment, dye chelates (for example, a basic dye type chelate, an acid dye type chelate, and the like), dye lakes (a basic dye type lake and an acid dye type lake), a nitro pigment, a nitroso pigment, aniline black, and a daylight fluorescent pigment.

Pigments usable for white ink are not particularly limited and white inorganic pigments, white organic pigments, and white hollow resin particles can be used, for example. The white inorganic pigments includes sulfates of alkaline earth metals, such as barium sulfate; carbonates of alkaline earth metals, such as calcium carbonate; silicas, such as fine powder silicic acid and synthetic silicate; metal compounds, such as calcium silicate, alumina, alumina hydrate, titanium oxide, and zinc oxide; talc, and clay. Moreover, C.I. Pigment White 6, 18, and 21 are also mentioned.

Pigments usable for yellow ink are not particularly limited and include, for example, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 155, 153, 154, 167, 172, 180, 185, and 213.

Pigments usable for magenta ink are not particularly limited and include, for example, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), (Mn), 57 (Ca), 57: 1, 88, 112, 114, 122, 123, 144, 146, 149, 150, 166, 168, 170, 171, 175, 176, 177, 178, 179, 184, 185, 187, 202, 209, 219, 224, and 245. C.I. Pigment Violet 19, 23, 32, 33, 36, 38, 43, and 50.

Pigments usable for cyan ink are not particularly limited and include, for example, C.I. Pigment Blue 1, 2, 3, 15, 15:1, 15:2, 15:3, 15:34, 15:4, 16, 18, 22, 25, 60, 65, and 66; and C.I. Vat Blue 4 and 60.

Pigments other than magenta, cyan, and yellow are not particularly limited and include, for example, C.I. Pigment Green 7 and 10; C.I. Pigment Brown 3, 5, 25, and 26; C.I. Pigment Orange 1, 2, 5, 7, 13, 14, 15, 16, 24, 34, 36, 38, 40, 43, and 63.

These pigments may be used singly or in combination of two or more kinds thereof.

The content of the pigment can be selected as appropriate according to the intended use and is preferably 0.1% by mass or more and 30% mass or lower, more preferably 0.2% by mass or more and 20% by mass or lower, and still more preferably 0.2% by mass or more and 5% by mass or lower based on the total mass of the ink composition.

First Wax Particles

The ink composition of this embodiment contains first wax particles having a melting point of 120° C. or higher and 170° C. or lower. The first wax particles having a relatively high melting point form a film with good surface slippage. Therefore, recorded matter formed using the ink composition of this embodiment is excellent in abrasion resistance.

The melting point of the first wax particles is 120° C. or higher and 170° C. or lower and more preferably 120° C. or higher and 140° C. or lower. Due to the fact that the melting point is in the range above, recorded matter more excellent in abrasion resistance can be obtained. The melting point can be measured with a differential scanning calorimeter (DSC). The melting point of the first wax particles can be controlled by, for example, adjusting the ratio of a plurality of constituent units constituting the wax particle.

The first wax particles contain at least one of polyethylene wax particles and polypropylene wax particles. Polyethylene wax particles having a melting point of 120° C. or higher and 170° C. or lower are not particularly limited and include, for example, AQUACERR515 (manufactured by BYK Chemie Japan) and Polylon L618 (manufactured by CHUKYO YUSHI CO., LTD.). The polyethylene wax particles having a melting point of 120° C. or higher and 170° C. or lower may be one synthesized by a usual method.

Polypropylene wax particles having a melting point of 120° C. or higher and 170° C. or lower are not particularly limited and include, for example, AQUACERR515 (manufactured by BYK Chemie Japan). The polypropylene wax particles having a melting point of 120° C. or higher and 170° C. or lower may be one synthesized by a usual method.

The first wax particles may be used singly or in combination of two or more kinds thereof.

The addition amount of the first wax particles into the ink composition is preferably 0.1 to 2.0% by mass and more preferably 0.2 to 1.0% by mass in terms of wax solid content based on the total mass of the ink composition. Due to the fact that the addition amount is in the range above, the abrasion resistance is more excellent.

The average particle diameter of the first wax particles is preferably 0.02 to 0.5 μm and more preferably 0.04 to 0.3 μm. Due to the fact that the average particle diameter is in the range above, the abrasion resistance is more excellent. Unless otherwise specified, the average particle diameter in the invention of this application is an average particle diameter based on volume measured by a laser diffraction/scattering method.

Second Wax Particles

The ink composition of this embodiment contains second wax particles having a melting point of 70° C. or higher and less than 120° C. When only the first wax particles are used for the purpose of increasing the abrasion resistance, the first wax is likely to be aggregated and solidified with the evaporation of moisture in nozzles of a discharge head to cause clogging of the nozzles of the discharge head, so that stable discharge is hindered in some cases. To solve the problem, the second wax particles having a relatively low melting point are used in combination, the aggregation of the first wax particles in the moisture evaporation is hindered. This can suppress poor discharge and clogging due to the adherence thereof to the nozzles of the discharge head, so that the ink composition is imparted with excellent recording stability. Moreover, in high temperature recording, the second wax particles suppress the film from being excessively weak due to the first wax particles. Therefore, even when recording is performed at a high temperature, the ink composition whose abrasion resistance is difficult to deteriorate is achieved. As described above, due to the fact that the ink composition of this embodiment contains the first wax particles and the second wax particles, recorded matter excellent in abrasion resistance is provided, the abrasion resistance does not deteriorate even in high temperature recording, and the recording stability is also excellent.

The melting point of the second wax particles is 70° C. or higher and less than 120° C., preferably 70° C. or higher and 110° C. or lower, and more preferably 80° C. or higher and 110° C. or lower. Due to the fact that the melting point is in the range above, recorded matter whose recording stability is more excellent and whose abrasion resistance is more difficult to deteriorate even in high temperature recording can be obtained. The melting point can be measured by the same method as above. The melting point of the second wax particles can be controlled by, for example, adjusting the ratio of a plurality of constituent units constituting the wax particle.

The second wax particles contain polyethylene wax particles. The polyethylene wax particles having a melting point of 70° C. or higher and less than 120° C. are not particularly limited and include, for example, Nopcoat PEM-(manufactured by San Nopco Limited), Polylon L787 and Polylon L788 (all manufactured by CHUKYO YUSHI CO., LTD.), and Chemipearl W4005 (manufactured by Mitsui Chemicals, Inc.). The polyethylene wax particles having a melting point of 70° C. or higher and less than 120° C. may be one synthesized by a usual method.

The second wax particles may be used singly or in combination of two or more kinds thereof.

The addition amount of the second wax particles into the ink composition is preferably 0.1 to 2.5% by mass and more preferably 0.2 to 1.5% by mass in terms of wax solid content based on the total mass of the ink composition. Due to the fact that the addition amount is in the range above, the recording stability is more excellent and the abrasion resistance is more difficult to deteriorate even in high temperature recording.

The average particle diameter of the second wax particles is preferably 0.02 to 0.5 μm and more preferably 0.04 to 0.3 μm. Due to the fact that the average particle diameter is in the range above, the recording stability is more excellent and the abrasion resistance is more difficult to deteriorate even in high temperature recording. The average particle diameter can be measured by the same method as above.

The amount of the second wax particles is larger in terms of mass than the amount of the first wax particles. Thus, the recording stability is more excellent and the abrasion resistance is more difficult to deteriorate even in high temperature recording.

The mass ratio of the total solid content of the first wax particles and the second wax particles to the total solid content of the resin emulsion is preferably 1:5 to 5:2, more preferably 2:5 to 2:1, and still more preferably 1:2 to 3:2. Due to the fact that the mass ratio is in the range above, recorded matter more excellent in abrasion resistance is provided, the degradation of the abrasion resistance is further suppressed even in high temperature recording, and the recording stability is more excellent.

Resin Emulsion

The ink composition of this embodiment contains a resin emulsion. The resin emulsion demonstrates an effect of, by forming a resin film, sufficiently fixing the ink composition onto a recording medium to achieve good abrasion resistance of an image. Due to the above-described effect, the recorded matter on which recording is performed using the ink composition containing the resin emulsion achieves particularly excellent adhesiveness and abrasion resistance on the non-ink-absorbing or low-ink-absorbing recording medium.

The Tg of the resin emulsion is 50° C. or higher and 150° C. or lower, preferably 60° C. or higher and 120° C. or lower, and more preferably 70° C. or higher and 100° C. or lower. Due to the fact that the Tg is in the range above, association of the resin emulsions is suppressed, the recording stability is more excellent, and the abrasion resistance of the recorded matter is also more excellent. The Tg can be measured by DSC similarly as the melting point.

The resin emulsion is not particularly limited and includes, for example, homopolymers or copolymers of (meth)acrylic acid, (meth)acrylate, acrylonitrile, cyanoacrylate, acryl amide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride, fluororesin, natural resin, and the like. Among the above, at least one of (meth)acrylic resin and styrene-(meth)acrylic acid copolymer resin is preferable, at least one of acrylic resin and styrene-acrylic acid copolymer resin is more preferable, and styrene-acrylic acid copolymer resin is still more preferable. The copolymers mentioned above may have any shape of a random copolymer, a block copolymer, an alternating copolymer, and a graft copolymer.

For the resin emulsion, commercially-available items may be used and the rein emulsion may be produced utilizing an emulsion polymerization method and the like as follows. As a method for obtaining the resin in the ink composition in the state of an emulsion, a method including emulsifying and polymerizing a water-soluble resin in water in which a polymerization catalyst and an emulsifier are made to be present. A polymerization initiator, an emulsifier, and a molecular weight adjuster for use in the emulsification and polymerization can be used according to known methods.

The average particle diameter of the resin emulsion is preferably in the range of 5 nm to 400 nm and more preferably in the range of 20 nm to 300 nm more in order to achieve more excellent storage stability and recording stability of ink.

The resin emulsions may be used singly or in combination of two or more kinds thereof. Among resin, the resin solid content of the resin emulsion is preferably 0.1 to 15% by mass and more preferably 0.5 to 10% by mass based on the total mass (100% by mass) of the ink composition. Due to the fact that the content is in the range above, the abrasion resistance and better recording stability of the recorded matter can be more favorable.

Alkyl Polyol Having Normal Boiling Point of 280° C. Or Higher

The ink composition does not substantially contain alkylpolyol having a normal boiling point of 280° C. or higher. Herein, the description of "does not substantially contain" means that a substance is not added with an amount larger than such an amount that the meaning of adding the substance is sufficiently demonstrated. The content of the alkylpolyol having a normal boiling point of 280° C. or higher in the ink composition is preferably 0% by mass or more and lower than 1.0% by mass, more preferably 0% by mass or more and lower than 0.5% by mass, still more preferably 0% by mass or more and lower than 0.1% by mass, yet still more preferably 0% by mass or more and lower than 0.05% by mass, even yet still more preferably 0% by mass or more and lower than 0.01% by mass is, and most preferably 0% by mass or more and lower than 0.001% by mass based on the total mass of the ink composition. Due to the fact that the content is in the range above, a reduction in abrasion resistance of recorded matter obtained using the ink composition caused by the alkylpolyol having a normal boiling point of 280° C. or higher is suppressed, so that recorded matter with more excellent abrasion resistance can be obtained.

Aprotic Polar Solvent

It is preferable for the ink composition to further contain an aprotic polar solvent. Due to the fact that the aprotic polar solvent is contained, the adherence of the pigment and the like can be suppressed, so that excellent clogging resistance is achieved. Moreover, the aprotic polar solvent has an effect of increasing the fixability on recording media of vinyl chloride and the like. The aprotic polar solvent is not particularly limited and includes, for example, dimethylsulfoxide (DMSO), dimethylformamide (DMF), hexamethylphosphoramide (HMPA), a pyrrolidone solvent, dioxane, and the like. The aprotic polar solvents may be used singly or in combination of two or more kinds thereof.

Among the above, by the use of a pyrrolidone solvent, the fixability of the ink composition can be further increased. The pyrrolidone solvent is not particularly limited and includes, specifically, N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. These substances may be used singly or in combination of two or more kinds thereof.

The addition amount of the aprotic polar solvent into the ink is preferable 1.0 to 30% by mass, more preferably 2 to 25% by mass, and still more preferably 12% by mass or more and 25% by mass or lower. Due to the fact that the addition amount is in the range above, the dispersion stability and the compatibility of the wax and the resin component in ink are more excellent.

Other Components

The ink composition for use in this embodiment can contain a water-soluble resin, water, an organic solvent, a surfactant, an antifoaming agent, a resin dispersant, glycol ethers, a pH adjuster, an antiseptic/antifungal agent, an antirust, a chelating agent, and the like. When the ink composition for use in this embodiment contains these components, the properties are further improved in some cases.

Water-soluble Resin

It is preferable for the ink composition of this embodiment to further contain a water-soluble resin. The water-soluble resin is not particularly limited and includes, for example, fiber resin, such as acrylic resin, styrene acrylic resin, rosin modified resin, phenol resin, terpene resin, polyester resin, polyamide resin, epoxy resin, polyurethane resin, vinyl chloride vinyl acetate copolymer resin, and cellulose acetate butyrate, and vinyltoluene-α-methylstyrene copolymer resin. The water-soluble resin may be used singly or in combination of two or more kinds thereof. Due to the fact that the water-soluble resin is contained, the glossiness of recorded images improves.

Water

It is preferable for the ink composition of this embodiment to contain water. Water is a medium serving as the main component of the ink composition and is a component which is evaporated and scatters by drying. Water is preferably one in which ionic impurities are removed as much as possible, such as pure water and ultrapure water, such as ion exchanged water, ultrafiltration water, reverse osmosis water, and distilled water. Moreover, when water which is sterilized by radiation of ultraviolet rays, addition of hydrogen peroxide, and the like is used, the generation of mold or bacteria can be prevented when storing a pigment dispersion and an ink composition containing the same over a long period of time. When containing water, the content of water is 50% by mass or more from the viewpoint of environmental properties and image drying properties.

Organic Solvent

The ink composition of this embodiment may further contain an organic solvent having a boiling point of 150° C. to 250° C. The organic solvent having a boiling point of 150° C. to 250° C. is evaporated by heating on a non-ink-absorbing or low-ink-absorbing recording medium to thereby fix ink to the recording medium.

The organic solvent having a boiling point of 150° C. to 250° C. is not particularly limited and includes, for example, propylene glycol, 1,3-propanediol, 1,2-butanediol, 1,3-butanediol, 1,4-butanediol, 1,2-pentanediol, 1,5-pentanediol, 1,2-hexanediol, and 1,6-hexanediol.

Surfactant

The ink composition of this embodiment may further contain a surfactant. The surfactant has an action of uniformly wetting and spreading the ink composition on a recording medium. The surfactant is not particularly limited and includes, for example, a silicone surfactant, a fluorine surfactant, and an acetylene glycol surfactant. Among the above, the silicone surfactant or the fluorine surfactant is preferable because the effect of uniformly wetting and spreading is high.

The silicone surfactant is not particularly limited and polysiloxane compounds and the like are preferably used and polyether modified organosiloxane and the like are mentioned, for example. Such a polysiloxane surfactant is not particularly limited and includes, specifically, BYK-306, BYK-307, BYK-333, BYK-341, BYK-345, BYK-346, BYK-347, BYK-348, and BYK-349 (All Product Name, manufactured by BYK Chemie Japan), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (All Product Name, manufactured by Shin-Etsu Chemical Co., Ltd.).

The fluorine surfactant demonstrates good wettability on low-absorbing and non-absorbing recording materials. The fluorine surfactant is not particularly limited and includes, for example, perfluoroalkyl sulfonate, perfluoroalkyl carboxylatet, perfluoroalkyl phosphate ester, perfluoroalkyl ethylene oxide adduct, perfluoroalkyl betaine, perfluoroalkyl amine oxide compound, and the like. Among the above, the compounds represented by the following formulae (1) to (6) are particularly preferably also from the viewpoint of reliability, and the compounds represented by the following formulae (1), (2), (3), and (5) are more preferable.

(In Formula (1), m represents an integer of 0 to 10 and n represents an integer of 0 to 40.)

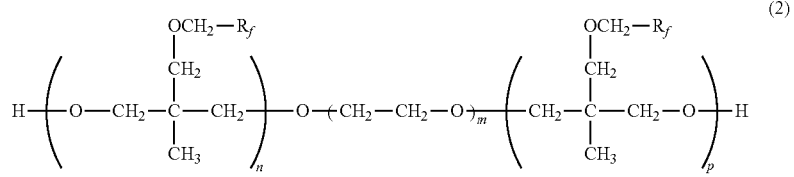

In Formula (2), Rf represents a fluorine containing group. The fluorine containing group is not particularly limited and includes, for example, $-CF_3$ and $-CH_2CF_3$. m, n, and p independently represent an integer, m represents an integer of 6 to 25, n represents an integer of 1 to 4, and p represents 1 to 4.

In Formula (3), $M^+$ represents $Li^+$, $Na^+$, $K^+$, and $NH_4^+$.

In Formula (4), Rf represents any one of $-CF_3$, $-C_2F_5$, $-C_3F_7$, and $-C_4F_9$ and $M^+$ represents any one of $Li^+$, $Na^+$, $K^+$, and $NH_4^+$.

In Formula (5), Rf represents any one of —CF$_3$, —C$_2$F$_5$, —C$_3$F$_7$, and —C$_4$F$_9$, R represents an alkyl group having 1 to 10 carbon atoms, and M$^+$ represents any one of Li$^+$, Na$^+$, K$^+$, and NH$_4^+$.

$$[(FSO_2)_2]N^-M^+ \qquad (6)$$

In Formula (6), M$^+$ represents any one of Li$^+$, Na$^+$, K$^+$, and NH$_4^+$.

As the fluorine surfactant, synthesized one may be used and a commercially-available item may be used as appropriate. Commercially-available items of the fluorine surfactant are not particularly limited and include, for example, S-144 and S-145 (manufactured by Asahi Glass Co., Ltd.); FC-170C, FC-430, and Fluorad FC4430 (manufactured by Sumitomo 3M, Inc.); FSO, FSO-100, FSN, FSN-100, and FS-300 (manufactured by Dupont); FT-250 and 251 (manufactured by Neos Co., Ltd.); and the like. Among the above, FSO, FSO-100, FSN, FSN-100, and FS-300 manufactured by Dupont can provide good recording quality and storageability, and thus are preferable. The fluorine surfactants may be used singly or in combination of two or more kinds thereof.

The addition amount of the fluorine surfactant into the ink is preferably 0.1% by mass to 10% by mass and more preferably 0.1% by mass to 5% by mass. Due to the fact that the addition amount is 0.1% by mass or more, a remarkable effect is demonstrated in an improvement of permeability. Due to the fact that the addition amount is 10% by mass or lower, an increase in viscosity, aggregation, and the like when stored under high temperature can be suppressed, so that the reliability improves.

The acetylene glycol surfactant is excellent in the capability to keep an appropriate surface tension and an appropriate interfacial tension as compared with other nonionic surfactants, and has a characteristic of less foamability. Thus, the ink composition containing the acetylene glycol surfactant can keep the surface tension and the interfacial tension with printer members in contact with the ink composition, such as a head nozzle surface, at an appropriate level. Therefore, when the ink composition is applied to an ink jet recording system, the recording stability can be improved.

The acetylene glycol surfactant is not particularly limited and includes, for example, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF-110D, and 82 (all Product Name, manufactured by Air Products and Chemicals. Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all Product Name, manufactured by Nisshin Chemical Co., Ltd.), Acetylenol E00, E00P, E40, and E100 (all Product Name, manufactured by Kawaken Fine Chemicals Co., Ltd.).

Antifoaming Agent

It is preferable for the ink composition to further contain an antifoaming agent. Due to the fact that the ink composition contains an antifoaming agent, the recording stability is more excellent.

Such an antifoaming agent is not particularly limited and includes, for example, a silicone antifoaming agent, a polyether antifoaming agent, a fatty acid ester antifoaming agent, and an acetylene antifoaming agent. Among the above, the silicone antifoaming agent and the acetylene antifoaming agent are preferable in terms of excellent foam breaking effect. The antifoaming agents may be used singly or in combination of two or more kinds thereof.

In the antifoaming agent, the HLB value based on the Griffin method is 6 or lower and more preferably 5 or lower. Due to the fact that the HLB value is 6 or lower, the generation of bubbles in an ink flow path in washing can be suppressed. Therefore, poor discharge of the ink composition due to mixing of bubbles can be reduced. In particular, when a piezoelectric type ink jet recording apparatus is used, poor discharge is likely to occur due to the generation of bubbles in an ink flow path. Therefore, it is preferable to add a surfactant having a HLB value of 5 or lower.

Herein, the HLB value of the antifoaming agent for use in this embodiment is a value for evaluating the hydrophilicity of compounds advocated by Griffin and refers to a value calculated by the following expression (1). The HLB value obtained by the Griffin method indicates a value in the range of 0 to 20 and shows that when the numerical value is larger, the compound is more hydrophilic.

$$\text{HLB value}=20\times(\% \text{ by mass of hydrophilic group})= \\ 20\times(\text{Total formula weight of hydrophilic group}/ \\ \text{Molecular weight of surfactant}) \qquad \text{Expression (1)}$$

The antifoaming agent having an HLB value of 6 or lower is not particularly limited and includes, specifically, Surfynol 104, 104E, 104H, 104A, 104BC, 104DPM, 104PA, 104PG-50, 104S, 420, DF-110D, and 82 (all Product Name, manufactured by Air Products and Chemicals. Inc.), BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (all Product Name, manufactured by BYK Chemie Japan, Inc.).

Resin Dispersant

The ink composition for use in this embodiment may contain a resin dispersant from the viewpoint of increasing the dispersibility of a coloring material in the ink composition. For the resin dispersant, any type of a water-soluble type and a water-insoluble type may be used.

Although the resin dispersant is not particularly limited and includes, specifically, polyvinyl alcohols, polyacrylic acid, an acrylic acid-acrylic nitrile copolymer, a vinyl acetate-acrylic acid ester copolymer, an acrylic acid-acryl ester copolymer, a styrene-acrylic acid copolymer, a styrene-methacrylic acid copolymer, a styrene-methacrylic acid-acrylic acid ester copolymer, a styrene-α-methyl styrene-acrylic acid copolymer, a styrene-α-methyl styrene-acrylic acid-acrylic acid ester copolymer, a styrene-maleic acid copolymer, a styrene-maleic acid anhydride copolymer, a vinyl naphthalene-acrylic acid copolymer, a vinyl naphthalene-maleic acid copolymer, a vinyl acetate-maleic acid ester copolymer, a vinyl acetate-crotonic acid copolymer, a vinyl acetate-acrylic acid copolymer, and salts thereof.

Mentioned as the salts are salts with basic compounds, such as ammonia, ethylamine, diethylamine, triethylamine, propylamine, isopropylamine, dipropylamine, butylamine, isobutylamine, diethanolamine, triethanolamine, triisopropanolamine, aminomethylpropanol, and morpholine. pH adjuster A pH adjuster is not particularly limited and includes, for example, potassium dihydrogen phosphate, disodium hydrogen phosphate, sodium hydroxide, lithium hydroxide, potassium hydroxide, ammonia, diethanol amine, triethanol amine, triisopropanol amine, potassium carbonate, sodium carbonate, and sodium hydrogencarbonate. These substances may be used singly or in combination of two or more kinds thereof.

Antiseptic/Antifungal Agent

An antiseptic/antifungal agent is not particularly limited and includes, for example, sodium benzoate, sodium pentachlorophenol, sodium-2-pyridinethiol-1-oxide, sodium sorbate, sodium dehydroacetate, 1,2-benzisothiazoline-3-on, and the like. Mentioned as commercially-available items are Proxel XL2, and Proxel GXL (all Product Name, manufactured by Avecia Inc.), Denicide CSA and NS-500W (all Product Name, manufactured by Nagase ChemteX Corporation), and the like. These substance may be used singly or in combination of two or more kinds thereof.

Antirust Agent

An antirust agent is not particularly limited and includes, for example, benzotriazole and the like.

Chelating Agent

A chelating agent is not particularly limited and includes, for example, ethylenediaminetetraacetic acid (EDTA) and salts thereof (disodium dihydrogen ethylenediaminetetraacetate and the like), iminodisuccinic acid and salts thereof, and the like.

Method for Preparing Ink Composition

The ink composition according to this embodiment is obtained by mixing the components mentioned above in an arbitrary order, and then performing filtration or the like as required to remove impurities. As a mixing method of the components, a method of successively adding materials into a container having a stirring device, such as a mechanical stirrer or a magnetic stirrer, and then stirring and mixing the materials is suitably used. As the filtration method, centrifugal filtration, filter filtration, and the like can be performed as required.

Non-ink-absorbing or Low-ink-absorbing Recording Medium

For the ink composition according to this embodiment, a non-ink-absorbing or low-ink-absorbing recording medium is suitably used as a recording medium. As such a recording medium, the non-ink-absorbing recording medium includes, for example, a plastic film which is not surface-treated for ink jet printing (i.e., an ink absorbing layer is not formed), one in which a base material, such as paper, is plastic-coated or plastic film is pasted to a base material, such as paper, and the like are mentioned, for example. As the plastic as used herein, polyvinyl chloride, polyethylene terephthalate, polycarbonate, polystyrene, polyurethane, polyethylene, polypropylene, and the like are mentioned. An example of the low-ink absorbing recording medium includes printing paper, such as art paper, coated paper, and mat paper.

Herein, the "non-ink absorbing or low-ink absorbing recording medium" in this description refers to a "recording medium in which the water absorption amount from the initiation of contact to 30 msec is 10 mL/m$^2$ or lower in the Bristow method". This Bristow method is the most spread method as a method for measuring the liquid absorption amount in a short time and is employed also in the Japan Technical Association of the Pulp and Paper Industry (JAPAN TAPPI). The details of a test method are described in "Liquid Absorbency Test Method of Paper and Paperboard (Bristow Method)" of No. 51 of "JAPAN TAPPI paper pulp test method, 2000".

Ink Jet Recording Method

An ink jet recording method of this embodiment includes a discharge process of discharging the ink composition described above to a recording medium and causing the ink composition to adhere thereto using a discharge head, and, after the discharge process, a heating process of heating the recording medium to which the ink composition adheres. Hereinafter, the ink jet recording method of this embodiment is described using a specific example of an ink jet recording apparatus which may be used for the ink jet recording method. The ink jet recording apparatus described later is not particularly limited insofar as recording is performed by the ink jet recording method using the ink composition described above and one having the same configuration as that of a former one can be used.

Discharge Process

The discharge process is a process of discharging the ink composition, and causing the ink composition to adhere to a recording medium using a discharge head. The temperature of the recording medium in the discharge process is preferably 30 to 60° C., preferably 45 to 60° C., and preferably 45 to 55° C. Due to the fact that the temperature of the recording medium in the discharge process is in the range above, the adherence of the first wax particles and the resin emulsion due to the aggregation thereof is suppressed, so that the recording stability is excellent. The discharge head can form a nozzle formation surface on which a plurality of nozzles which discharge the ink composition are provided and the nozzle formation surface may have a water-repellent film.

Heating Process

The heating process is a process of heating the recording medium to which the ink composition adheres after the discharge process. The heating temperature in the heating process is preferably higher than 80° C. and 120° C. or lower, more preferably higher than 80° C. and 110° C. or lower, and still more preferably higher than 85° C. and 110° C. or lower. Due to the fact that the heating temperature is in the range above, recorded matter of the ink composition containing a polymer which generally has a high melting point tends to become weak. However, according to the ink jet recording method of this embodiment, the second wax particles suppress the film from being weak due to the first wax particles, so that the degradation of the abrasion resistance of the recorded matter is further suppressed. Thus, high speed recording is achieved. In the heating process, even when the recording medium may be heated from the surface to which the ink composition adheres, may be heated from a surface opposite to the adhesion surface, or both the heating methods may be heated. Such a heating method includes, specifically, heater heating, radiation heating by an infrared heater, and warm air heating of a path for transporting the recording medium. In this specification, the heating temperature means a temperature of the surface of the recording medium in contact with the ink composition. The temperature can be measured using a commercially-available thermography apparatus. A specific example of the thermography apparatus includes an infrared thermography apparatus H2640/H2630 [Product Name] (manufactured by NEC Avio Infrared Technologies Co. Ltd.).

It is preferable for the discharge head to have nozzle formation surface on which a plurality of nozzles which discharge the ink composition are formed and a head plate which covers the nozzle formation surface. The head plate plays the role of fixing a chip constituting the nozzle formation surface.

Wiping Process

It is preferable for the ink jet recording method of this embodiment to further have a wiping process of wiping away the ink composition adhering to the nozzle formation surface by a wiping member and the wiping member is preferably an absorbing member. Thus, the wiping properties of an adherent are more excellent. In particular, the ink composition of the invention of this application quickly dries and is easily solidified. When the adherent is wiped away with one, such as a rubber blade, the adherent cannot be favorably removed in many cases, so that there is a possibility that solidified matter causes curved discharge and poor adhesion with a cap member which caps the head. Therefore, it is preferable to use an absorbing member. Moreover, when the wiping member is an absorbing member, also in the case of the discharge head having the above-described head plate, the wiping member is flexibly deformed to wipe away the ink composition adhering to the nozzle formation surface. The wiping member is not particularly limited insofar as the ink composition adhering to discharge ports of the discharge nozzles and the nozzle formation surface can be absorbed. The wiping member is not particularly limited and includes, specifically, cloth, sponge, pulp, and the like.

The ink jet recording method of this embodiment may be one having the same processes as those of known ink jet recording methods in addition to the above-described processes.

EXAMPLES

Hereinafter, the invention is more specifically described with reference to Examples and Comparative Examples. The invention is not limited at all to the following Examples.

1. Materials for Ink Composition

The main materials contained in the ink compositions used in the following Examples and Comparative Examples are as follows.
Pigment
C.I. Pigment Blue 15:3
Dispersant Resin
Styrene-acrylic acid water-soluble resin (Tg 55° C.)
Binder Solid Content
Styrene-acrylic acid resin emulsion (Tg 80° C.)
Styrene-acrylic acid resin emulsion (Tg 40° C.)
Wax Solid Content
Polyethylene wax 1 (manufactured by BYK Chemie Japan, Product Name AQUACERR515, Melting point 135° C.)
Polyethylene wax 2 (manufactured by San Nopco Limited., Product Name Nopcoat PEM-17, Melting point 103° C.)
Polyethylene wax 3 (manufactured by CHUKYO YUSHI CO., LTD.,
Product Name Polylon L787, Melting point 88° C.)
Solvent
1,2-hexanediol
2-pyrolidone
Surfactant
Silicone surfactant (manufactured by BYK Chemie Japan, Product Name BYK-348)

2. Preparation of Ink Composition

Ink compositions of Examples and Comparative Examples were prepared with materials and compositions shown in the following table 1. Specifically, each ink composition was prepared by uniformly mixing each material, and then removing undissolved matter with a filter. In the following table 1, the unit of the numerical values is % by mass and the total is 100.0% by mass.

3. Ink Jet Recording Method (Examples 1 to 5, Comparative Examples 1 to 4)

An ink jet printer PX-G930 (Product Name, manufactured by Seiko Epson Corp., Nozzle resolution: 180 dpi) which was subjected to predetermined conversion, such as attaching a heater whose temperature is variable to a recording medium guide portion, was used as an ink jet recording type printer. The discharge head was provided with nozzles which discharge the ink composition, a nozzle formation surface on which a plurality of nozzles are formed, and a head plate which covers the nozzle formation surface. A wiping member which wipes away the ink composition adhering to the nozzle formation surface was further provided. As the wiping member, cupra which is an absorbing member was used.

Solid recording was performed using the converted PX-G930 machine with each ink composition prepared above on a white PVC film (LLSPEX113, manufactured by Sakurai, Inc.) at a recording medium temperature of 60° C. by an ink jet method with a discharge amount of 9 mg/square inch per unit area, and then the heating process was performed under the following heating process conditions to thereby obtain each recorded matter.
Heating Process Conditions
Heating temperature 100° C.×2-minute drying 3. Evaluation
Abrasion Resistance The abrasion resistance of each recorded matter obtained as described above was evaluated based on the following evaluation criteria. The results are shown in Table 1.
Evaluation Criteria
○: Scratches/Separation did not occur when rubbed 50 times and the underground was not exposed.
Δ: Scratches/Separation occurred when rubbed 40 to 50 times and the underground was exposed.
x: Separation occurred when rubbed less than 40 times and the underground was exposed.
Recording Stability The recording stability was judged whether nozzle omission and curved discharge occurred when continuously discharging each ink composition by an ink jet method at a recording medium temperature of 60° C. The evaluation criteria are shown below. The results are shown in Table 1.
Evaluation Criteria
○: Nozzle omission/Curved discharge did not occur when 2 pages of character strings were recorded throughout a A4 size copy paper.

TABLE 1

| | | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|
| Pigment solid content | C.I. Pigment Blue 15:3 | 4.0 | 4.0 | 4.0 | 4.0 | 4.0 | 4.0 | 4.0 | 4.0 | 4.0 |
| Dispersant resin | Styrene-acrylic acid water-soluble resin | 1.0 | 1.0 | 1.0 | 1.0 | 1.0 | 1.0 | 1.0 | 1.0 | 1.0 |
| Binder solid content | Styrene-acrylic acid resin emulsion (Tg 80° C.) | 1.0 | 1.0 | 1.0 | 1.0 | 1.0 | — | 1.0 | 1.0 | 1.0 |
| | Styrene-acrylic acid resin emulsion (Tg 40° C.) | — | — | — | — | — | 1.0 | — | — | — |
| Wax solid content | Polyethylene wax 1 (Melting point 135° C.) | 0.1 | 1.0 | 0.1 | 1.0 | 0.1 | 0.1 | — | 0.1 | — |
| | Polyethylene wax 2 (Melting point 103° C.) | 0.5 | 0.5 | 1.0 | 1.0 | — | 0.5 | 0.5 | — | 0.5 |
| | Polyethylene wax 3 (Melting point 88° C.) | — | — | — | — | 0.5 | — | — | — | 0.5 |
| Solvent | 1,2-hexanediol | 6.0 | 6.0 | 6.0 | 6.0 | 6.0 | 6.0 | 6.0 | 6.0 | 6.0 |
| | 2-pyrolidone | 15.0 | 15.0 | 15.0 | 15.0 | 15.0 | 15.0 | 15.0 | 15.0 | 15.0 |
| Surfactant | Silicon Surfactant | 0.5 | 0.5 | 0.5 | 0.5 | 0.5 | 0.5 | 0.5 | 0.5 | 0.5 |
| Water | | Balance | Balance | Balance | Balance | Balance | Balance | Balance | Balance | Balance |
| Abrasion resistance | 100° C. × 2 minutes drying | ○ | ○ | ○ | ○ | ○ | x | x | Δ | x |
| Recording stability | 60° C. thermal printing/recording restarting properties | ○ | ○ | ○ | ○ | ○ | x | ○ | x | ○ | x: Nozzle omission/Curved discharge occurred on the beginning of the 2 page after 1 page of character strings were recorded throughout a A4 size copy paper.

As described above, it was shown that the ink compositions of Examples provided recorded matter excellent in abrasion resistance and the recording stability was also excellent. Moreover, it was shown that the abrasion resistance did not deteriorate under the heat-drying conditions of 100° C.×2 minutes.

On the other hand, it was shown that Comparative Example 1 not containing the resin emulsion having Tg of 50° C. or higher and 150° C. or lower was inferior in both abrasion resistance and recording stability. It was shown that Comparative Examples 2 and 4 not containing the first wax particles were inferior in abrasion resistance. It was shown that Comparative Example 3 not containing the second wax particles was inferior in recording stability. Moreover, it was shown that the abrasion resistance deteriorated in the heat-drying process of 100° C.×2 minutes.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

The entire disclosure of Japanese Patent Application No. 2013-032418, filed Feb. 21, 2013 is expressly incorporated by reference herein.

What is claimed is:

1. An ink composition, comprising:
a pigment;
first wax particles having a melting point of 120° C. or higher and 170° C. or lower, the first wax particles containing one or more kinds of wax particles selected from the group consisting of first polyethylene wax particles or polypropylene wax particles;
second wax particles having a melting point of 70° C. or higher and less than 120° C., the second wax particles containing second polyethylene wax particles; and
a resin emulsion having a glass transition point of 50° C. or higher and 150° C. or lower,
wherein the first polyethylene wax particles have the melting point of 120° C. or higher and 170° C. or lower, and the second polyethylene wax particles have the melting point of 70° C. or higher and less than 120° C.

2. The ink composition according to claim 1, substantially not containing alkylpolyol having a normal boiling point of 280° C. or higher.

3. The ink composition according to claim 1, wherein an amount of the second wax particles is larger in terms of mass than an amount of the first wax particles.

4. The ink composition according to claim 1, wherein a mass ratio of a total amount of the first wax particles and the second wax particles to a total amount of the resin emulsion is 1:5 to 5:2.

5. The ink composition according to claim 1, further comprising an aprotic polar solvent.

6. The ink composition according to claim 1, further comprising a water-soluble resin.

7. An ink jet recording method, comprising:
discharging the ink composition according to claim 1 to a recording medium and causing the ink composition to adhere thereto using a discharge head; and
heating the recording medium to which the ink composition adheres.

8. An ink jet recording method, comprising:
discharging the ink composition according to claim 2 to a recording medium and causing the ink composition to adhere thereto using a discharge head; and
heating the recording medium to which the ink composition adheres.

9. An ink jet recording method, comprising:
discharging the ink composition according to claim 3 to a recording medium and causing the ink composition to adhere thereto using a discharge head; and
heating the recording medium to which the ink composition adheres.

10. An ink jet recording method, comprising:
discharging the ink composition according to claim 4 to a recording medium and causing the ink composition to adhere thereto using a discharge head; and
heating the recording medium to which the ink composition adheres.

11. An ink jet recording method, comprising:
discharging the ink composition according to claim 5 to a recording medium and causing the ink composition to adhere thereto using a discharge head; and
heating the recording medium to which the ink composition adheres.

12. An ink jet recording method, comprising:
discharging the ink composition according to claim 6 to a recording medium and causing the ink composition to adhere thereto using a discharge head; and
heating the recording medium to which the ink composition adheres.

13. The ink jet recording method according to claim 7, wherein a heating temperature in the heating step is higher than 80° C. and 120° C. or lower.

* * * * *